UNITED STATES PATENT OFFICE 2,118,799

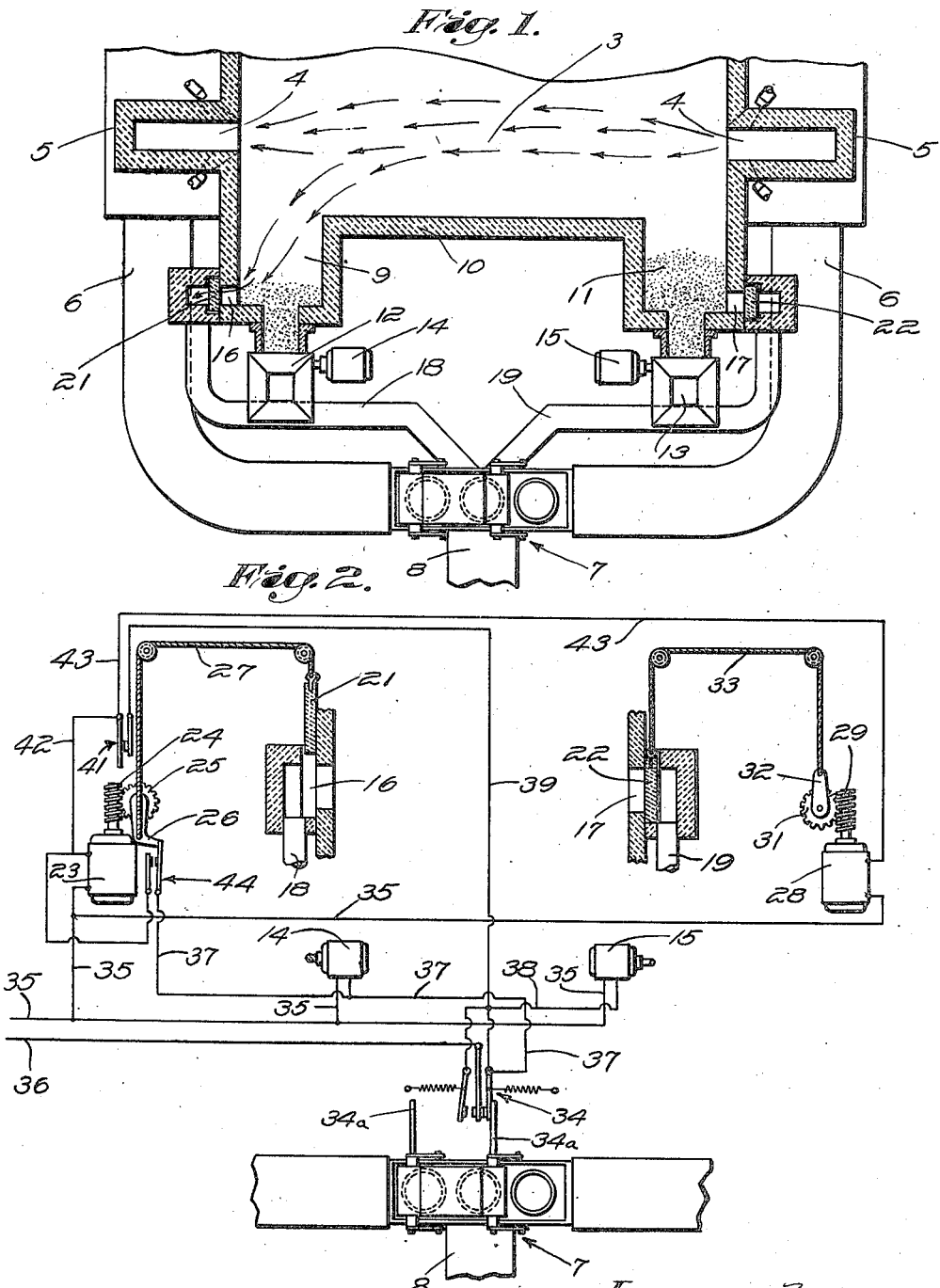

METHOD AND APPARATUS FOR MAKING GLASS

Paul G. Willetts, West Hartford, Conn., assignor to Hartford-Empire Company, Hartford, Conn., a corporation of Delaware Application November 13, 1936, Serial No. 110,555

10 Claims. (Cl. 49—54)

This invention relates to the melting of glass in a continuous tank furnace of the reversible regenerative type, and has particular relation to the feeding of the batch and application of heat thereto in the melting zone of the tank.

It is an object of the present invention to provide a novel method of and apparatus for feeding batch wherein and whereby as the fire is reversed from side to side of the melting chamber, the feeding of charges is alternated from one to the other side or corner of said chamber opposite to the side from which the fire is being directed. This may be termed "reversing or reversible batch feeding".

Another object of the invention is to make novel provision for preheating and fritting of each charge as it is being supplied and in such a manner as to prevent batch dust being freed and carried into the regenerators.

Other and more specific objects and advantages of the invention will be pointed out in the detailed description of the invention which follows or will become apparent therefrom or from the accompanying drawing, wherein:

Figure 1 is a view in horizontal top plan of the melting end portion of a glass tank furnace embodying the invention; and Fig. 2 is a diagrammatic view of an electric circuit for effecting reversible batch feeding in timed relation with and in response to the operation of means for reversing the fire in the tank furnace.

The present invention may be employed and embodied in any well-known type of continuous regenerative tank furnace and at 3 is shown the melting end portion of such a tank, at 4—4 one each of opposed series of burners, and at 5—5 the regenerators of such a tank furnace. Flues 6—6 lead from the regenerators to a reversing valve 7 which places either flue in communication with flue 8 which leads to a stack (not shown).

The construction so far described is conventional and the novel features of the invention will now be described.

At the rear of the tank and preferably at its corners, bays or doghouses 9 and 11 are formed as side extensions, these bays being separated by a wall 10 and having automatic batch feeders 12 and 13 connected respectively thereto. These batch feeders may be of any known construction and they include respectively electric motors 14 and 15.

Ports 16 and 17 lead from the bays 9 and 11 respectively to flues 18 and 19 which are connected centrally of reversing valve 7 for permanent communication with stack flue 8. Ports 16 and 17 have dampers 21 and 22 therein, adapted to be raised or lowered to permit the alternate diverting of streams of combustion gases from the fire in chamber 3 through the respective bays 9 and 11. Damper 21 is raised and lowered by motor 23, worm 24, gear 25, crank 26 and cord 27 which passes over pulleys, as shown, and is connected to the damper. Similarly motor 28, worm 29, gear 31, crank 32 and cord 33 raise and lower damper 22.

The method of the invention resides in alternately feeding charges of batch into the bays 9 and 11 as the fire is reversed from one side to the other of the melting chamber. Thus, if the firing is from the right to the left, as indicated in Fig. 1, feeding will be in progress in bay 9, the charge being received by the molten glass in the bay. In order to preheat and frit the batch thus being supplied, damper 21 is held open to cause a stream of combustion gases to be drawn through bay 9 over the glass and batch therein, which stream is drawn off through port 16 and flue 18 without passing through either regenerator. This prevents the freeing of batch dust and guards against passage thereof into the ports and checkers of the regenerators, thus preventing impairment of the refractories thereof. In the meantime, batch which previously has been fed into bay 11 and preheated and fritted therein by a stream of gases passing through port 17 and flue 19, will be further heated and melted by radiant heat in bay 11, and after passing or during passage out of bay 11, by direct flame and radiation in the melting chamber. When the firing is reversed so as to be directed from left to right looking at Fig. 1, the feeding of a charge of batch to bay 9 and passage of combustion gases therethrough will be discontinued and resumed in bay 11, and this alternation in feeding of charges will be continued from time to time as the firing is reversed.

During the interval between the feeding of charges of batch in each of the bays, there is opportunity for a charge of batch to be substantially heated and melted before the next charge is fed. This results in more rapid and efficient melting than if the batch should be fed continuously because in that case, the incoming batch masks and insulates the preceding batch from the radiant and direct heat in the bay and melting chamber. This is largely avoided in my novel method.

In performing the novel method, suitable means may be provided for operating dampers 21 and 22 and for starting and stopping motors 14 and 15 either manually or automatically. The apparatus of my invention, however, provides novel means for controlling such parts automatically in timed relation with, and operating in response to, the reversing mechanism of the furnace. Such means will now be described.

Referring to Fig. 2, there is shown at 34 a switch which is operated by rods 34a—34a on the reversing valve 7, when moved in one direction or the other, to control the operation of motors 14, 15, 23 and 28. Lines 35 and 36 lead from a suitable source of current (not shown) and of these lines, 35 is permanently connected to one of the terminals of each of the motors, as shown, and line 36 leads to switch 34.

With the parts in the positions shown, the circuit to motor 14 of batch feeder 12 is closed through switch 34 and line 37. Batch feeder 12 is now operating to feed a charge of batch to bay 9 and damper 21 associated with this bay is open.

Upon reversing the furnace, valve 7 is moved to the right and switch 34 operated to stop motor 14 and start motor 15 of batch feeder 13, the circuit to motor 15 being completed through line 38. At the same time, the circuit through damper motors 23 and 28 is completed, to motor 23 through line 39, a closed limit switch 41 and line 42 and to motor 28 from limit switch 41 through line 43. Motor 23 thus runs to close damper 21 and motor 28 runs to open damper 22. When damper 21 reaches closed position, crank 26 opens limit switch 41 to stop motor 23 and this also stops motor 28 with damper 22 in fully open position.

A charge of batch is now being fed into bay 11 while the firing is from left to right, a diverted stream of gases passing over the batch in bay 11 and through flue 19 directly to the stack.

Reversal of the fire to fire from right to left again operates switch 34 to stop motor 15 and start motor 14 through the connections previously described. At this time, the circuit also is completed through line 37 and a limit switch 44 to start motor 23, and through line 43 to start motor 28. Damper 21 is now opened and damper 22 closed, the damper motors being stopped at the appropriate time by the opening of limit switch 44 by arm 26. It will be noted that the first part of the movement of arm 26 in this operation permits limit switch 41 to close in preparation for the next operation of the damper motors 23 and 28.

My novel control mechanism results in feeding a charge of batch in one of the bays concurrently with the firing of the tank from the side opposite to or remote from that bay.

Various changes may be made in the method and illustrated embodiment of the apparatus without departing from the scope of the appended claims.

It will be understood that in a tank furnace embodying my invention, suitable means is provided for controlling the supply of fuel to the burners on the respective sides of the melting end of the tank for the purpose of reversing the direction of the fire from side to side of the melting end. Such means are well-known and can readily be supplied by one skilled in the art. The operation of the batch feeders 12 and 13 and of dampers 21 and 22 may be controlled from any part of the reversing mechanism, such as the mechanism controlling the operation of the burners referred to above but not illustrated herein, as well as from the reversing valve, as illustrated and described.

I claim:

1. The method of making glass in a tank furnace wherein the fire is reversed from side to side of the melting end of the tank which comprises alternately feeding charges of batch at separated points in the melting end as the firing is reversed.

2. The method of making glass in a tank furnace wherein the direction of the fire is reversed from side to side of the melting end of the tank which comprises alternately feeding charges of batch at the sides or corners respectively of the melting end toward which the fire is directed.

3. The method of making glass in a tank furnace wherein the direction of the fire is reversed from side to side of the melting end of the tank which comprises alternating the feeding of charges of batch between separated points in the melting end as the direction of the fire is reversed, and preheating and fritting each charge as it is being delivered by passing a stream of gases of combustion thereover.

4. The method of making glass in a tank furnace wherein the direction of the fire is reversed from side to side of the melting end of the tank which comprises alternating the feeding of charges of batch between separated points in the melting end as the direction of the fire is reversed, preheating and fritting each charge as it is being delivered by passing a stream of combustion gases thereover, and subjecting a delivered charge to radiant heat and direct fire while another charge is being delivered, preheated and fritted.

5. The method of making glass in a tank furnace wherein the direction of the fire is reversed from side to side of the melting end of the tank which comprises' alternately feeding charges of glass at the sides or corners of the melting end whichever is opposite to or remote from the side of the melting end from which the fire is directed, the feeding of each charge being continued substantially concurrently with firing from such opposite or remote side, passing a stream of combustion gases over each charge as it is being delivered to preheat and frit the batch, and discontinuing the passage of such stream over a charge when feeding thereof is completed, and thereafter heating the charge and glass derived therefrom by the radiant heat and direct fire in the melting end and during the period another charge is being fed at the opposite side or corner of said chamber.

6. A reversible regenerative tank furnace for melting glass comprising means for reversing the direction of the fire in said tank furnace, batch feeders for feeding charges adjacent the sides of tank in the melting end thereof, and means for controlling said feeders to feed charges of batch alternately adjacent the respective sides of said melting end as the direction of the fire is reversed by said reversing means.

7. A reversible regenerative tank furnace for melting glass comprising means for reversing the direction of the fire in said furnace, batch feeders for alternately feeding charges of batch to the melting end portion of the tank, and means operating in response to the operation of said reversing means for controlling the alternate feeding of charges by said batch feeders.

8. A reversible regenerative tank furnace for melting glass comprising a reversing valve for reversing the direction of the fire in said furnace, batch feeders for alternately feeding charges of glass to the melting end portion of the tank, and means operating in response to the operation of said reversing valve for controlling the alternate feeding of charges by said batch feeders.

9. A reversible regenerative tank furnace for melting glass comprising means for reversing the direction of the fire in said furnace, batch receiving bays adjacent the corners of the melting end portion of said tank, batch feeders associated with said bays for feeding batch thereto, each bay having a port for establishing a stream of combustion gases from the melting end of the tank through the respective bays, dampers associated with said ports, and means for alternately opening and closing said dampers as the fire is reversed by said reversing means.

10. A reversible regenerative tank furnace for melting glass comprising means for reversing the direction of the fire in said furnace, batch receiving bays adjacent the corners of the melting end portion of said tank, batch feeders associated with said bays for feeding batch thereto, each bay having a port for establishing a stream of combustion gases from the melting end of the tank through the respective bays, dampers associated with said ports, means for alternately opening and closing said dampers as the fire is reversed, and means for controlling said batch feeders to feed charges alternately to said bays in coordination with the operation of said reversing means.

PAUL G. WILLETTS.